UNITED STATES PATENT OFFICE.

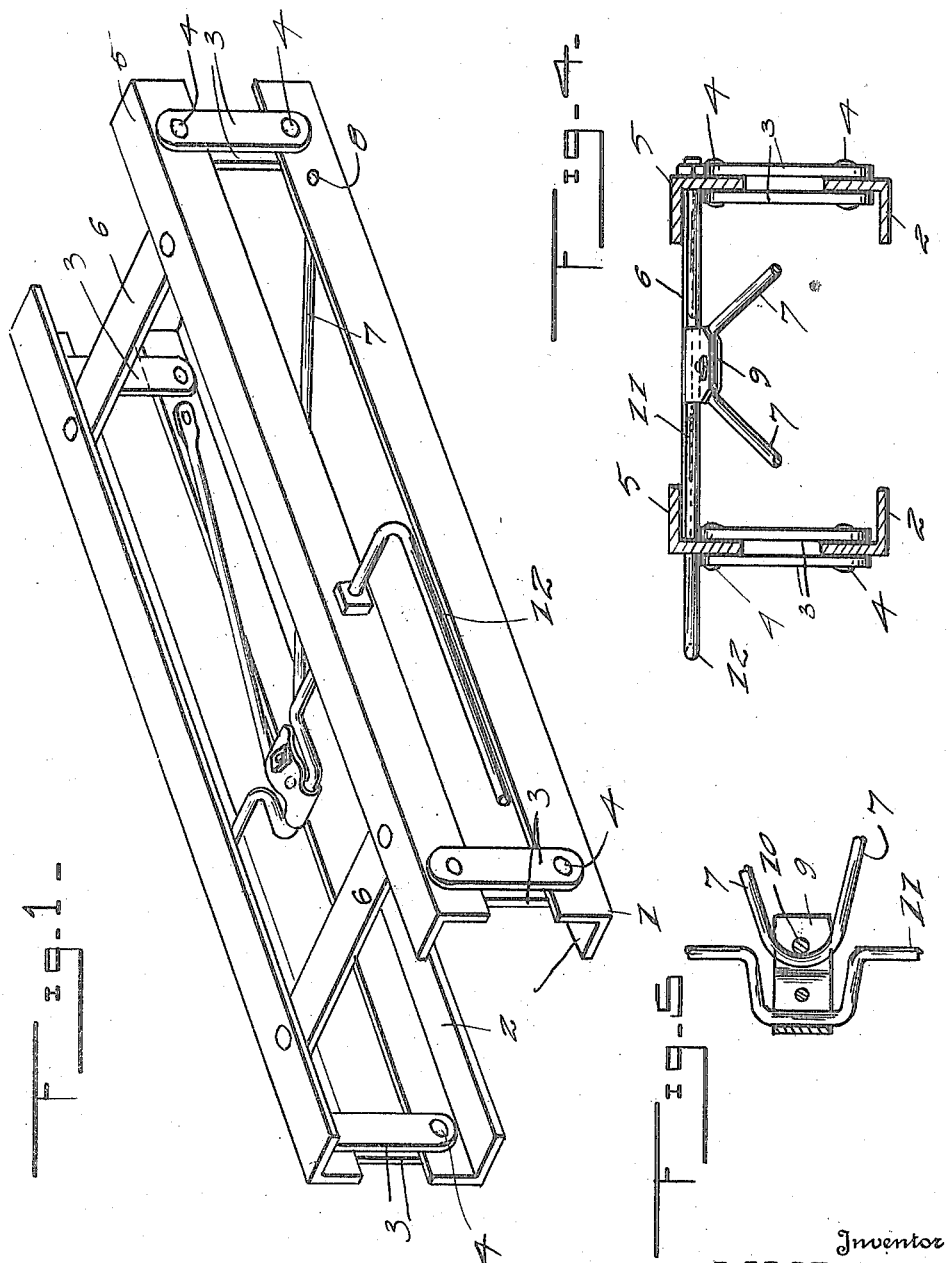

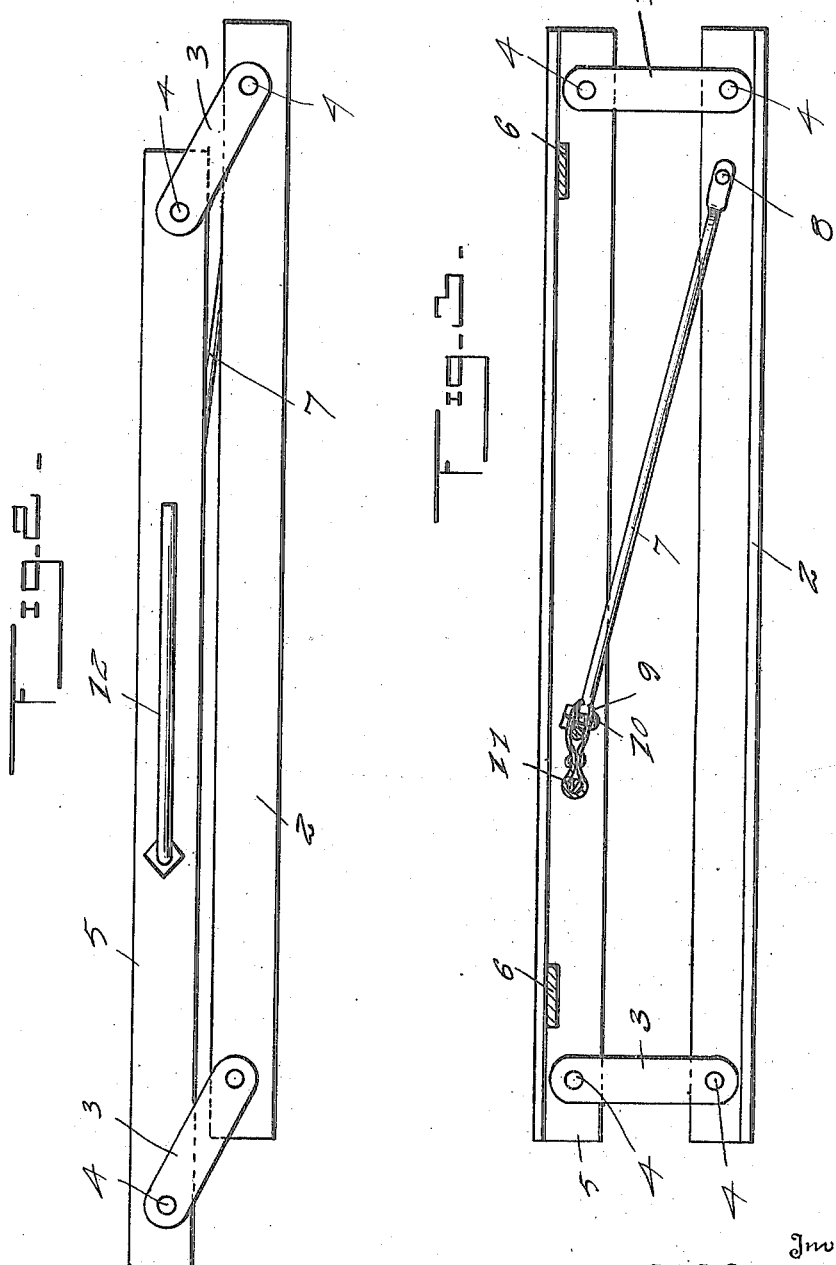

MONTE M. LANE AND HENRY L. BOSTON, OF LONG POINT, ILLINOIS.

AUTOMOBILE-LIFTING DEVICE.

1,248,872. Specification of Letters Patent. Patented Dec. 4, 1917.

Application filed April 18, 1917. Serial No. 162,989.

*To all whom it may concern:*

Be it known that we, MONTE M. LANE and HENRY L. BOSTON, citizens of the United States, residing at Long Point, in the county of Livingston and State of Illinois, have invented certain new and useful Improvements in Automobile-Lifting Devices; and we do hereby declare the following to be a full, clear, and exact description of the invention, such as will enable others skilled in the art to which it appertains to make and use the same.

This invention relates to improvements in an automobile lifting device and has for one of its objects the provision of a device of this character, whereby an automobile or like vehicle may be driven to overlie the device and upon operation of the same, the automobile or like vehicle will be elevated from engagement with the ground, thus relieving the strain of weight upon the tires and bearings of the same.

Another object of this invention is the provision of supporting members having pivoted thereto, elevating means, which is adapted to engage the running gear of an automobile or vehicle for elevating the same from engagement with the ground.

A further object of this invention is the provision of a novel means of elevating the elevating means carried by the supporting members.

A still further object of this invention is the provision of an automobile lifting device of the above stated character, which shall be simple, durable and efficient, and which may be manufactured and sold at a comparatively low cost.

With these and other objects in view, as will become more apparent as the description proceeds, the invention consists in certain novel features of construction, combination and arrangement of parts as will be hereinafter more fully described and claimed.

For a complete understanding of our invention, reference is to be had to the following description and accompanying drawings, in which:

Figure 1 is a perspective view of an automobile lifting device constructed in accordance with our invention.

Fig. 2 is a side elevation of the same, in a lowered position.

Fig. 3 is a longitudinal sectional view of the device in an elevated position.

Fig. 4 is a transverse sectional view illustrating the means for pivotally connecting the elevating means to the supporting means, and Fig. 5 is a detail sectional view illustrating the connection employed in the elevating means.

Referring in detail to the drawings, the numeral 1 indicates a pair of relatively spaced supporting members, which are constructed from angle irons, which have their portions 2 disposed horizontally for forming an efficient support for the device.

Pairs of links 3 are pivoted to the vertical portions of the angle iron members 1 as shown at 4 and have their upper ends pivoted to elevating members 5, which are constructed from angle iron, as clearly illustrated in Fig. 1. The members 5 are secured together by a transverse strip 6.

A substantially U-shaped member 7 has its arm portions pivoted to the members 1 adjacent one end thereof as clearly shown at 8. A clip 9 is secured to the web portion of the U-shaped member 7 by a bolt 10 and has journaled therein, a crank shaft 11. The crank shaft 11 is journaled in the members 5 and has formed upon one end a suitable handle 12 for rotating the same to lower and elevate the elevating members 5.

In operation, the elevating members 5 are lowered as shown in Fig. 2 and an automobile or like vehicle is driven over the device and by rotating the handle 12 the elevating members 5 are elevated, lifting the vehicle from its engagement with the ground, thus relieving the strain upon the tires and bearings thereof.

While we have shown and described the preferred embodiment of our invention, it will be understood that minor changes in construction, combination and arrangement of parts may be made without departing from the spirit and scope of the invention as claimed.

Having thus described our invention, what we claim is:

A lifting device comprising a pair of supporting members constructed from angle iron having one portion thereof disposed horizontally to form supporting faces therefor, elevating members disposed over and extending parallel with the supporting members, pairs of links pivotally connecting the members, means connecting the elevating members, a crank shaft journaled to the elevating members, a U-shaped member having the ends of its arm portions pivoted to one end of the supporting members and having its web portion disposed adjacent the crank of said shaft, and a clip secured to the web portion of the U-shaped member and having the crank journaled therein for raising and lowering the elevating members upon rotation of the shaft.

In testimony whereof we affix our signatures in presence of two witnesses.

MONTE M. LANE.
HENRY L. BOSTON.

Witnesses:
H. F. BRANDES,
O. B. WHEELER.

Copies of this patent may be obtained for five cents each, by addressing the "Commissioner of Patents, Washington, D. C."